(12) United States Patent
Zhu

(10) Patent No.: US 7,193,442 B2
(45) Date of Patent: Mar. 20, 2007

(54) USB 1.1 FOR USB OTG IMPLEMENTATION

(75) Inventor: Xiaoming Zhu, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 242 days.

(21) Appl. No.: 10/945,286

(22) Filed: Sep. 20, 2004

(65) Prior Publication Data

US 2006/0076977 A1 Apr. 13, 2006

(51) Int. Cl.
*H03K 19/0175* (2006.01)
*H03K 19/00* (2006.01)
*H03K 25/00* (2006.01)
*G06F 13/42* (2006.01)

(52) U.S. Cl. .................. 326/82; 326/102; 710/105
(58) Field of Classification Search .................. 326/82, 326/102; 710/9, 14, 305, 311, 313, 315, 710/105
See application file for complete search history.

(56) References Cited

U.S. PATENT DOCUMENTS

| | | | |
|---|---|---|---|
| 7,000,057 B1 * | 2/2006 | Novell et al. ............... | 710/306 |
| 2003/0204652 A1 * | 10/2003 | Saito et al. .................... | 710/33 |
| 2004/0133820 A1 * | 7/2004 | Tanabe et al. .............. | 713/600 |
| 2006/0045112 A1 * | 3/2006 | Laiho .......................... | 370/419 |
| 2006/0075152 A1 * | 4/2006 | Zhu ............................. | 710/15 |

OTHER PUBLICATIONS

"USB On-The-Go Basics". Application Note 1822. Maxim IC. Dallas Semiconductor. Dec. 20, 2002, <http://www.maxim-ic.com/an1822>.*

"Power Supply IC S1FF84100 Technical Manual". Seiko Epson Corporation. Mar. 2004. Document Code 404896200.*
"Microsoft Press Computer Dictionary". Second Edition, Microsoft Press. 1994. pp. 261, 307, and 308.*
"USB On-The Go". USB Implementers Forum, Inc. Online Jun. 6, 2002. Retrieved from Internet Jun. 15, 2006. <http://web.archive.org/web/20020606022045/http://www.usb.org/developers/onthego/>.*
"May 2001 Conference Presentations". USB Implementers Forum, Inc. Retrieved from Internet Jun. 21, 2006. <http://www.usb.org/developers/presentations/pres0501/>.*
"On-The-Go Supplement to the USB 2.0 Specification". Revision 1.0. Dec. 18, 2001.*
"SL811HS OTG Application Note". Cypress Semiconductor Corporation. Dec. 17, 2001.*
Koeman, Kosta. "Understanding USB On-The-Go". EDN Magazine. Nov. 22, 2001. pp. 79-80 and 82.*

(Continued)

*Primary Examiner*—Glenn A. Auve
*Assistant Examiner*—Thomas J. Cleary
(74) *Attorney, Agent, or Firm*—Robert D. Marshall, Jr.; W. James Brady; Frederick J. Telecky, Jr.

(57) ABSTRACT

This invention enables a USB 1.1 device and a USB 1.1 host to communicate seamlessly with a USB OTG device. The invention complies with both USB 1.1 and OTG specifications. The invention includes the USB 1.1 host, USB 1.1 device and mixed signal circuits to implement USB OTG functions. The mixed signal components are controlled by the USB 1.1 device microcontroller. The invention is a cost effective implementation compared to a custom ASIC design for USB OTG implementation.

2 Claims, 5 Drawing Sheets

OTHER PUBLICATIONS

Yarra, Srinivas. "USB OTG software frees dual-role handheld devices". EDN Magazine. May 16, 2002. pp. 83-84 and 86-88.*

"USB On-The-Go: A Tutorial". Philips Semiconductors. Jan. 2002. Document Order No. 9397 750 09316.*

Tija, Jerome. "High-Speed Detection Handshake Considerations". May 2001 Conference Presentation. May 9, 2001.*

Koeman, Kosta. "USB On-The-Go". May 2001 Conference Presentation. May 9. 2001.*

"USB On-The-Go Implementation". On-The-Go Training Seminar Presentation. London, UK Feb. 26, 2002.*

"USB On-The-Go Electrical". On-The-Go Training Seminar Presentation. London, UK Feb. 26, 2002.*

* cited by examiner

USB 1.1 FOR USB OTG IMPLEMENTATION

TECHNICAL FIELD OF THE INVENTION

The technical field of this invention is retrofit circuits enabling a USB 1.1 device to operate as a USB OTG device.

BACKGROUND OF THE INVENTION

Universal Serial Bus (USB) ports have been employed widely to connect peripheral devices to computers. Typical peripheral connections connected through USB are Printers, scanners, zip drives, digital cameras, mice, joysticks, modems, speakers, telephones, video phones and network connections.

Almost all peripheral devices now come in a USB version. The Universal Serial Bus allows for the connection of up to 128 devices to a computer. Upon connection of a new device the operating system auto-detects it and requests driver input. If the device has already been installed, the computer activates it and starts communication with it.

FIG. 1 illustrates a conventional USB 1.1 master-slave system 100 connected to a USB 1.1 slave only device 107. The USB master-slave system 100 includes a USB 1.1 device 101, a USB 1.1 host 102 and a microcontroller 103 that provides control of the device 101 and host 102 as well as USB 1.1 protocol communications capability with USB 1.1 device 107 through USB 1.1 connectors 104 and 106 via USB 1.1 cable 105.

Many USB devices come with their own cable. The cable either has an A connection or the device has a socket that accepts a USB B connector. The USB standard uses A and B connectors to avoid confusion. A connectors are connected to host default functions. B connectors are connected to device default functions.

Using different connectors on the upstream and downstream end avoids any possible confusion and any USB device having either A or B cabling will function properly. The Universal Serial Bus has the following features. The computer acts as the host. Up to 127devices can connect to the host either directly or via a USB hub. Individual USB cables can run as long as 5 meters. Using a hub, devices can be up to 30 meters or about six cable lengths away from the host. A USB 1.1 bus has a maximum data rate of 12 megabits per second; A USB 2.0 bus has a maximum data rate of 480 megabits per second. A USB cable has two wires for power (+5 volts and ground) and a twisted pair of wires carrying data in differential form. The computer can supply up to 500 milliamps of power at 5 volts on the power wires. Low-power devices, such as a mouse, can draw their power directly from the bus. High-power devices such as printers must have their own power supplies and draw minimal power from the bus. Hubs can have their own power supplies to provide power to devices connected to the hub. USB devices are hot-swappable because the user can plug them into the bus and unplug them any time. Many USB devices can be put to sleep by the host computer when the computer enters a power-saving mode.

Slave devices connected to a USB port rely on the USB host and its cable to supply power and data. When the host powers up, it queries all of the devices connected to the bus and assigns each an address. This process is called enumeration. Devices are enumerated when they connect to the bus. The host finds out from each device what type of data transfer it wishes to perform:

1. Interrupt—A device like a mouse or a keyboard, which will be sending very little data, would choose the interrupt mode.

2. Bulk—A device like a printer, which receives data in one big packet, uses the bulk transfer mode. A block of data is sent to the printer (in 64-byte segments) and verified to make sure it is correct.

3. Isochronous—a streaming device such as a speaker uses the isochronous mode. Data streams between the device and the host in real-time and there is no error correction. The host can also send commands or query parameters with control packets.

The Universal Serial Bus divides the available bandwidth into frames and the host controls the frames. For USB 1.1 frames contain 1,500 bytes (12,000 bits) and a new frame starts every millisecond. During a one second interval of time 12 megabits of data may be transmitted. For USB 2.0 the data rate is forty times higher and a new frame starts every microsecond. During a one second interval of time 480 megabits of data may be transmitted. USB specifications allow interrupt devices to have a portion of the frames so they are guaranteed the bandwidth they need. Bulk data and control transfers use whatever space is left.

The standard for USB version 2.0 was released in April 2000 and serves as an upgrade for USB 1.1. USB 2.0 (High-speed USB) provides additional bandwidth for multimedia and storage applications. To allow a smooth transition for both consumers and manufacturers, USB 2.0 has full forward and backward compatibility with original USB devices and works with cables and connectors made for earlier versions of USB.

Supporting three speed modes (1.5, 12 and 480 megabits per second), USB 2.0 supports low-bandwidth devices such as keyboards and mice, as well as high-bandwidth devices like high-resolution Webcams, scanners, printers and high-capacity storage systems. The deployment of USB 2.0 has allowed the PC industry to forge ahead with the development of next-generation PC peripherals to complement existing high-performance PCs. The transmission speed of USB 2.0 also facilitates the development of next-generation PCs and applications. In addition to improving functionality and encouraging innovation, USB 2.0 increases the productivity of user applications and allows the user to run multiple PC applications at once or several high-performance peripherals simultaneously.

USB On-the-Go (OTG) is a new USB communication protocol specified in the USB 2.0 specification. USB OTG allows peer-to-peer communications between two USB OTG devices enabling, for example, a digital camera to directly communicate with a printer without the need of a PC as a host. Generally a USB 1.1 device cannot directly communicate with a USB OTG device because of communication protocol differences. As USB OTG is gaining popularity, the demand for USB 1.1 devices to communicate with USB OTG devices has created additional technical challenges.

The OTG supplement to the USB 2.0 specification uses the following defined terms.

Host USB device attaches to a USB cable and acts in the role of initiating all data transmission transactions and provides periodic start-of-frame timing.

USB A-Device supplies power to the Vbus power line. It is host at the start of a transaction session. It will relinquish the role of host to a dual-role B-Device to which it is connected by a USB cable. This can occur only under the rules determined by the host negotiation protocol (HNP).

USB B-Device is always a peripheral at the start of a transaction session. B-devices may be single role (peripheral only) or dual-role (peripheral/host). Typically a B-Device requests a session according to USB 2.0 OTG session request protocol (SRP). If a B-Device is dual-role it may subsequently be granted the role of host from the A-Device under USB 2.0 OTG host negotiation protocol (HNP).

The OTG supplement defines a session request protocol (SRP), which allows a B-device to request the A-device to turn on Vbus and start a session. This protocol allows the A-device, which may be battery powered, to conserve power by turning Vbus off when there is no bus activity while still providing a means for the B-device to initiate bus activity.

Dual-role devices are required to be able to initiate and respond to SRP. Any A-device, including a PC or laptop, is allowed to respond to SRP. Any B-device, including a standard USB peripheral, is allowed to initiate SRP.

The OTG supplement defines two methods used by the B-device to request that the A-device begin a session. They are called data-line pulsing and Vbus pulsing. These two methods comprise the session request protocol (SRP).

The two signaling methods (Vbus pulsing and data-line pulsing) allow maximum latitude in the design of A-devices. An A-device need respond to only one of the two SRP signaling methods. The B-device shall use both methods when initiating SRP to insure that the A-device responds.

The B-device may not attempt to start a new session until it has determined that the A-device has signaled the end of the previous session. The A-device signals the end of a session by allowing Vbus to drop below its session valid threshold (SVT). Since the A-device SVT may be as low as 0.8 volts, the B-device must insure that Vbus is below this level before requesting a new session. The B-device may ensure that Vbus is below the B-device session-end threshold either by direct measurement of Vbus or by timing the discharge.

Additionally, the B-device may switch in a pull-down resistor from Vbus to ground in order to speed the discharge process as long as the pull-down resistor does not cause the B-device to draw more than 8 mA from the Vbus.

A second initial condition for starting a new session is that the B-device must detect that both the D+ and D− data lines have been below the session end detect (SED) threshold for at least 2 mS. This ensures that the A-device has detected a disconnect condition from the B-device.

When the B-Device detects that Vbus has gone below its session end detect (SED) threshold and detects that both D+ and D− have been below SED for at least 2 mS, then any previous session on the A-device is over and a new session may start.

To indicate a request for a new session using the data-line pulsing SRP, the B-device waits until the initial conditions are met and then turns on its data line pull-up resistor (either D+ or D−) for a period of 5 mS to 10 mS. The dual-role B-device is only allowed to initiate SRP at full-speed and thus shall only pull up D+. The duration of such a data line pulse must be sufficient to allow the A-device to reject spurious voltage transients on the data lines. An A-device that is designed to detect the data-line pulsing method of SRP will detect that a data line (either D+ or D−) has gone high and generate an indication that SRP has been detected.

To indicate a request for a new session using the Vbus pulsing method, the B-device waits until the initial conditions are met and then drives Vbus. Vbus is driven for a period that is long enough for a maximum capacitance on Vbus to be charged to 2.1 volts.

There are two scenarios that a B-device could encounter when pulsing Vbus to initiate SRP. In one scenario, the B-device is connected to an A-device that responds to the Vbus pulsing SRP. In this case, the B-device can drive Vbus above the A-device session valid threshold (SVT) in order to wake up the A-device. When driving such an A-device, the B-device shall ensure that Vbus goes above 2.1 volts but does not exceed 5.25 volts.

In the second scenario, the B-device is attached to a standard host. In this case, the B-device shall not drive Vbus above 2.0 volts. This insures that no damage is done to standard hosts that are not designed to withstand a voltage externally applied to Vbus. In order to meet these requirements, the B-device can utilize the fact that the capacitance on a standard host will have well-defined minimum and maximum values. Based on the difference between these two capacitances and a self-imposed current limit, the B-device has a maximum length of time it is allowed to drive Vbus. By driving Vbus for this duration it is possible to guarantee that Vbus will rise above 2.1 volts if attached to a dual-role device, while ensuring that Vbus will not exceed 2.0 volts if attached to a standard USB host.

The B-device Vbus pulsing circuitry must limit the maximum current drawn by the B-Device to 8 mA. One way to ensure this restriction is met is to drive Vbus with a voltage source greater than 3.0 volts and with an output impedance greater than 280 ohms.

The A-device continuously monitors Vbus as long as power is available on the A-device. An A-device that is designed to detect the Vbus pulsing method will detect that Vbus has gone above the A-device session valid threshold (SVT) and generate an indication that SRP has been detected.

When a B-device detects that the voltage on Vbus is greater than the B-Device session valid threshold (SVT), then the B-device shall consider a session to be in progress. After the Vbus voltage crosses this threshold, the B-device shall assert either the D+ or D− data-line within 100 mS.

The maximum time allowed for the B-device to complete all of its SRP initiation activities is 100 mS. The B-device shall first perform data-line pulsing, followed by Vbus pulsing.

Host negotiation protocol (HNP) is used to transfer control of a connection from the default host (A-device) to the default Peripheral (B-device). This is accomplished by the A-device preparing or conditioning the B-device to take control of the bus and then the A-device presenting an opportunity for the B-device to take control.

The B-device is conditioned when the A-device sends a set feature enable (SFE) command. After sending this command, the A-device may suspend the bus to signal the B-device that it may now take control of the bus. If the B-device wants to use the bus at that time, it signals a disconnect to the A-device. If the A-device has enabled the B-device to become host, then the A-device will interpret this disconnect during suspend as a request from the B-device to become host. The A-device will complete the handoff by turning on the pull-up resistor on D+.

When the B-device has finished using the bus, it returns control to the A-device simply by stopping all bus activity and turning on its D+ pull-up resistor. The A-device will detect this lack of activity and turns off its pull-up resistor. When the A-device detects the connection from the B-device, it returns to operation as host.

The following is the normal host negotiation protocol sequence of events:

1. A-device finishes using bus and stops all bus activity, (i.e. suspends the bus).

2. B-device detects that bus is idle for more than 3 mS and begins (HNP) by turning off pull-up on D+. This allows the bus to discharge to the SED state. If the bus was operating in high speed mode, the B-device will first enter the full-speed mode and turn on its D+ pull-up resistor before turning off its pull-up to start the HNP sequence.

3. The A-device detects the SEO on the bus and recognizes this as a request from the B-device to become host. The A-device responds by turning on its D+ pull-up resistor within 3 mS of first detecting the SEO on the bus.

4. After waiting long enough to insure that the D+ line cannot be high due to the residual effect of the B-device pull-up, the B-device sees that the D+ line is high and D− is low. This indicates that the A-device has recognized the HNP request from the B-device. The B-device then becomes host and asserts bus reset to start using the bus. The B-device must assert the bus reset (SEO) within 1.0 mS of the time that the A-device turns on its pull-up.

5. When the B-device completes using the bus, it stops all bus activity. Optionally, the B-device may turn on its D+ pull-up at this time.

6. A-device detects lack of bus activity for more than 3 mS and turns off its D+ pull-up. Alternatively, if the A-device has no further need to communicate with the B-device, the A-device may turn off Vbus and end the session.

7. The B-device turns on its pull-up.

8. After waiting long enough to insure that the D+ line cannot be high due to the residual effect of the A-device pull-up, the A-device sees that the D+ line is high (and D−low) indicating that the B-device is signaling a connect and is ready to respond as a peripheral. The A-device then becomes host and asserts bus reset to start using the bus.

SUMMARY OF THE INVENTION

The present invention describes a low-cost interface function, which enables USB 1.1 device and USB 1.1 host to communicate seamlessly with a USB 2.0 OTG device. Prior techniques allow the OTG device to communicate only with another OTG device and do not enable a standard USB 1.1 device to communicate with a USB OTG device. A supplemental mixed signal interface circuitry and microcontroller programming upgrades a USB 1.1 system to interface with a USB 2.0 OTG system by mimicking USB 2.0 OTG functions. The mixed signal interface circuitry performs crucial functions required to assure compliance with USB 2.0 OTG specifications.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
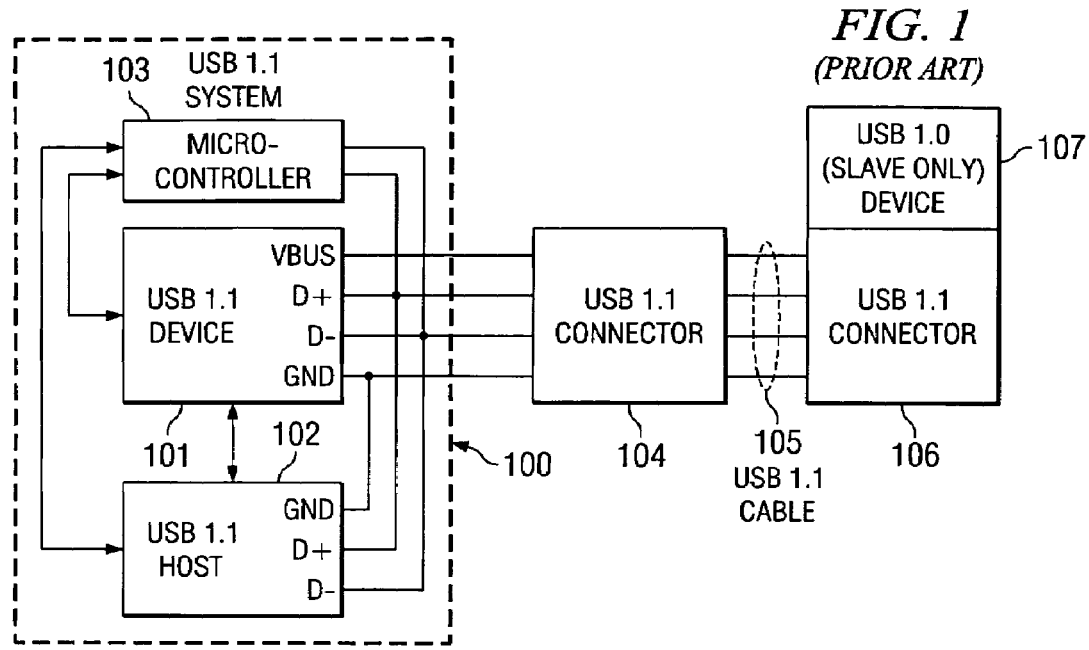
FIG. 1 illustrates the block diagram of a conventional USB 1.1 system comprising a microcontroller, USB 1.1 host and a USB 1.1 device connected to an external USB 1.1 device through a USB cable (Prior Art)
Figure 2:
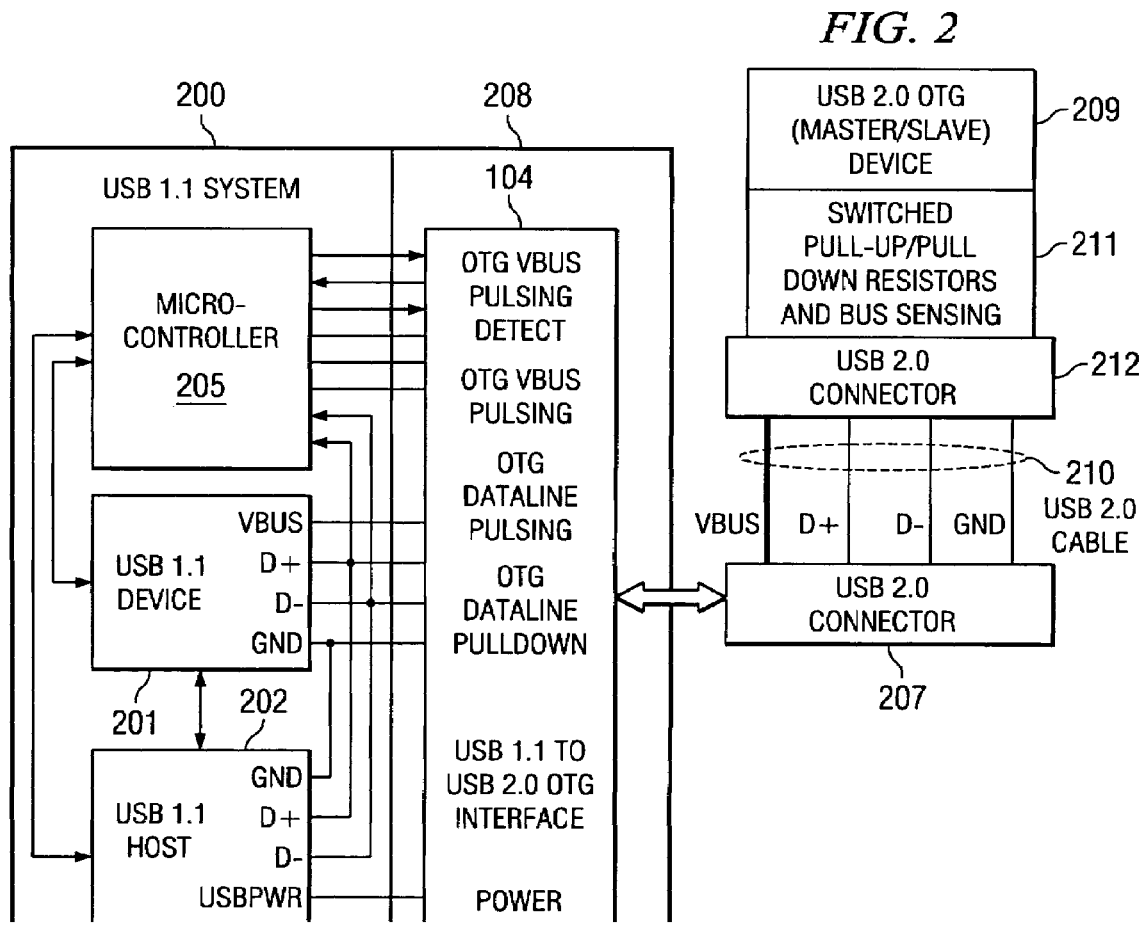
FIG. 2 illustrates the block diagram of a modified USB 1.1 system comprising a microcontroller, a USB 1.1 host and a USB 1.1 device and the mixed signal interface circuit of this invention connected to an external USB 2.0 OTG single role or dual-role device through USB cable.

FIG. 2, illustrates a block diagram of this invention. This includes a hardware interface function 208, which enables the modified USB 1.1 system 200 including a microcontroller 205, an USB 1.1 device 201 and an USB 1.1 host 202 and the mixed signal interface circuit 208 to communicate seamlessly with an USB 2.0 OTG device 209. The full interface uses both software programming of the microcontroller device 205 and the hardware interface 208. The USB 2.0 OTG device 209, which may be either single role (slave) or dual-role (host/slave), is connected to the USB 1.1 system 200 through USB connectors 207 and 212 and USB cable 210. Microcontroller 205 performs internal frame timing functions to synchronize the occurrence of pulsing, detect and pull-up/pull-down control signals to implement SRP and HNP. USB 1.1 device 201 and host 202 hardware need no modification to achieve the interface, although microcontroller programming is required and additional microcontroller input/output signals not used in the USB 1.1 system are required to complete the USB 1.1 to USB 2.0 OTG interface 211.

Figure 3:
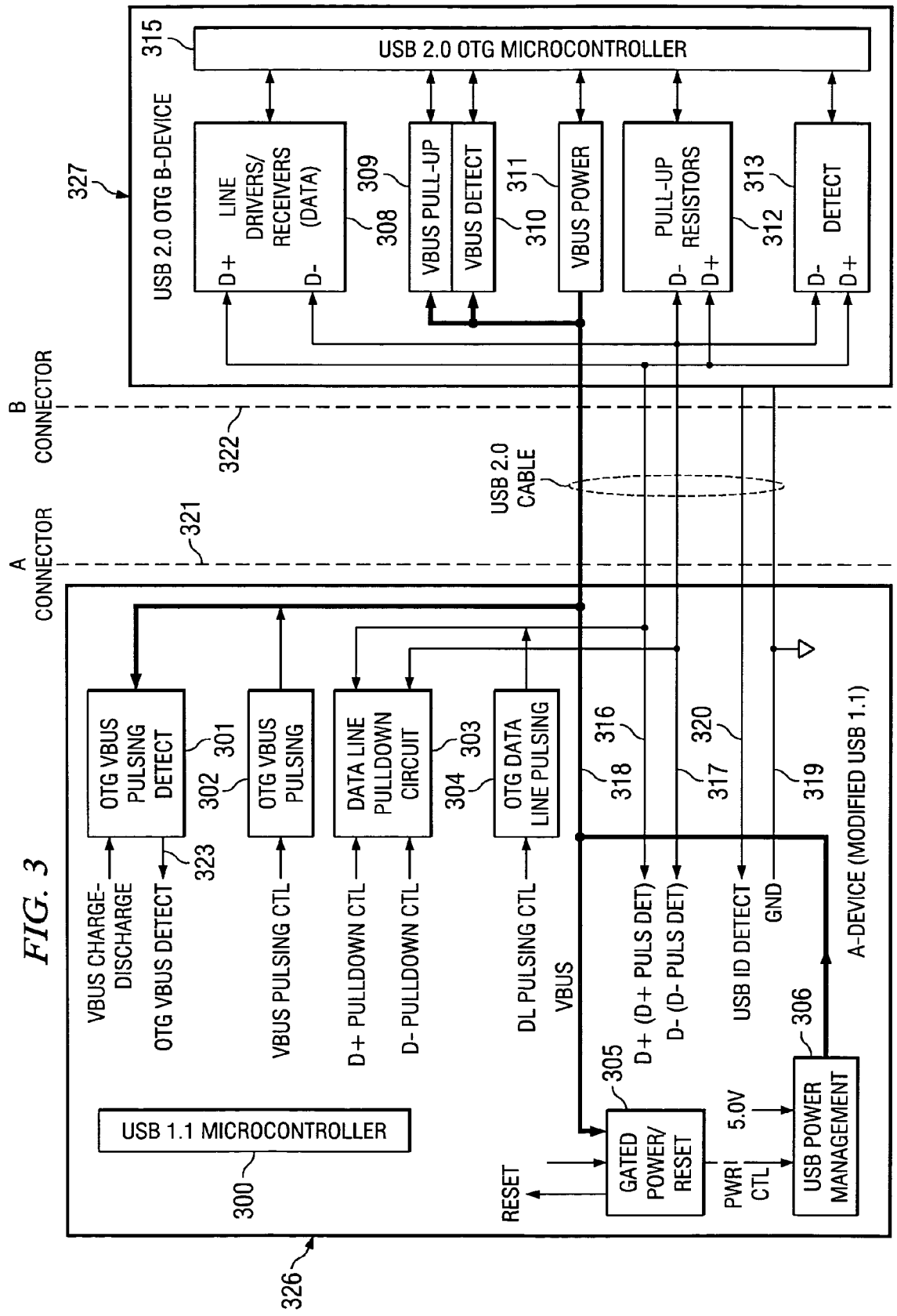
FIG. 3 illustrates the signal and interface function blocks of this invention for connection of a conventional USB 1.1 system A-Device to an external USB 2.0 OTG device/host B-Device.

Consider, first, the modified USB 1.1 system acting as an A device (default host). FIG. 3 illustrates the modified USB 1.1 OTG microcontroller 300 and interface hardware 301 through 306 and their required interconnect to the USB 1.1 A-connector 321 side of the interface. The A-Device boundary is denoted by 326. USB cabling consists of D+ and D− data lines, 316 and 317 respectively, Vbus (power supply) line 318, GND 319 and USB ID detect line 320. An USB 2.0 OTG B-device 327 including microcontroller 315 and interface hardware functions 308 through 313 is connected to the USB cable through a B-connector 322. Device hardware 301 through 306 provides an upgrade of the normal USB 1.1 capability to a modified USB 1.1 having USB 2.0 OTG compatibility. The B-device 327 of FIG. 3 illustrates only in symbolic form the hardware necessary to implement the USB 2.0 OTG requirements and the SRP and HNP protocols described above. This hardware includes functional blocks 308 through 313 and microcontroller 315. The detailed content of these functions of the USB 2.0 OTG B-device is not a part of the invention. Circuit blocks 301–306 perform actions initiated by A-device 326. USB ID detect line 320 is shorted to ground when connected to an A-connector and open when connected to a B-connector. This allows unambiguous determination of the A-device as default host and B-device as default slave.

Consider the example where A-device 326 is default host device and conducts data transmission according to USB timing requirements. A-device 326 via gated power/reset block 305 starts a session by performing a bus reset and powers up Vbus via USB power management block 306. Normal bus activity then can take place including transfer of control and data information from the A-device to the B-device via the differential data bus, which includes twisted pair lines D+ 316 and D– 317. Normal bus activity concludes when the data transfer is complete. This could include hundreds of frames of data. At this point A-device 326 can enter a shut-down or sleep mode and cut off power to the Vbus line via USB power management block 306. Once normal bus activity ceases, a time window of 100 milliseconds (100 frames) is open for the B-device to request the start of a new session under session request protocol.

In session request protocol the B-device 327 requests a new session from A-device in sleep mode by executing the following steps:

1. Vbus/Dataline detect: Detect Vbus less than 0.8 volts and D+ and D–low for 2 mS. This is performed by Vbus detect block 310 and D+/D– detect block 313.

2. Dataline pulsing: B-device 327 must perform dataline pulsing by switching in pull-up resistors via block 312 for a period of 5 to 10 mS.

3. Vbus pulsing: B-device 327 must perform Vbus pulsing by switching in pull-up resistors via block 309 until Vbus is greater than 2.1 volts.

4. B-device 327 must allow A-device 5 seconds minimum to respond. After 5 seconds, B-device 327 may repeat steps 1–3. During the 5 seconds allotted, A-device 326 must perform the following steps:

5. Detect dataline pulsing: performed by the USB 1.1 device microcontroller sensing inputs 316 and 317 from D+/D– lines respectively.

6. Detect Vbus pulsing: performed by the block 301 of modified USB 1.1 device. This is illustrated in FIG. 5. Circuit block 301 is dual function performing both Vbus pulsing detect in the configuration of FIG. 3 and performing Vbus off detection in the reversed connection of FIG. 4. Circuit block 301 is a dual function performing both Vbus pulsing detect in the configuration of FIG. 3 and performing Vbus off detection in the reversed connection of FIG. 4. OTG Vbus detect line 323 is fed to microcontroller 300 which acknowledges a valid session request from B-device 326 by performing a reset and via block 305 then powers up Vbus via block 306.

The B-device Vbus pulsing circuitry must limit the maximum current drawn by the B-Device to 8 mA. This restriction is met by having the Vbus pull-up block 309 drive Vbus with a voltage source greater than 3.0 volts and with an output impedance greater than 280 ohms.

In host negotiation protocol the B-device 327 requests a new session from the A-device 326 in sleep mode. Host negotiation protocol (HNP) is used to transfer control of a connection from the default host (A-device) to the default Peripheral (B-device). This is accomplished by A-device 326 preparing or conditioning the B-device 327 to be able to take control of the bus and then A-device 326 presenting an opportunity for the B-device 327 to take control.

A-device 326 will complete the handoff by turning on the pull-up resistor on D+ line 316. This switched resistor is internal to the USB 1.1 device microcontroller 300.

When the B-device 327 has finished using the bus, it returns host control to A-device 326 by stopping all bus activity and turning on its D+ pull-up resistor. A-device 326 detects this lack of activity and turns off its pull-up resistor. When the A-device 326 detects the connection from the B-device 327, it resumes bus operation as host.

The sequence of events in host negotiation protocol (HNP) is as follows:

1. At the conclusion of a session periodically the A-device 326 sends a set feature enable (SFE) command over D+/D– lines 316/317 preparing the B-device for possible HNP. After sending this command, A-device 326 suspends data transmission activity to signal the B-device that it may now take control of the bus.

2. B-device 327 detects in block 310 that bus is idle for more than 3 mS and begins (HNP) by turning off pull-up on D+. This pull-up is contained within block 312. This allows the bus to discharge to the session end zero SEO state.

3. The A-device 326 detects the SEO on the bus and recognizes this as a request from the B-device 327 to become host. A-device 327 responds by turning on its D+ pull-up resistor within 3 mS of first detecting the SEO on the bus. This pull-up is contained within microcontroller 300 of the A-device 326.

4. After waiting long enough to insure that the D+ line cannot be high due to the residual effect of B-device 327 pull-up, B-device 327 detects in block 313 that the D+ line is high and D– is low. This indicates that the A-device 326 has recognized the HNP request from B-device 327. B-device 327 then becomes host and asserts bus reset to start using the bus. B-device 327 must assert the bus reset (SEO) within 1.0 mS of the time that A-device 326 turns on its pull-up in step 3.

5. When B-device 327 completes using the bus, it stops all bus activity.

6. A-device 326 detects the lack of bus activity for more than 3 mS via block 301 and turns off its D+ pull-up. Alternatively, if the A-device 326 has no further need to communicate with B-device 327, the A-device 326 may turn off Vbus and end the session.

7. B-device 327 turns on its pull-up within block 312 signifying that it is relinquishing host status.

8. After waiting long enough to insure that the D+ line cannot be high due to the residual effect of the A-device pull-up, the A-device sees that the D+ line is high (and D–low) indicating that the B-device is signaling a connect and is ready to respond as a slave device peripheral. At this point, the A-device becomes host and asserts bus reset to start using the bus.

Figure 4:
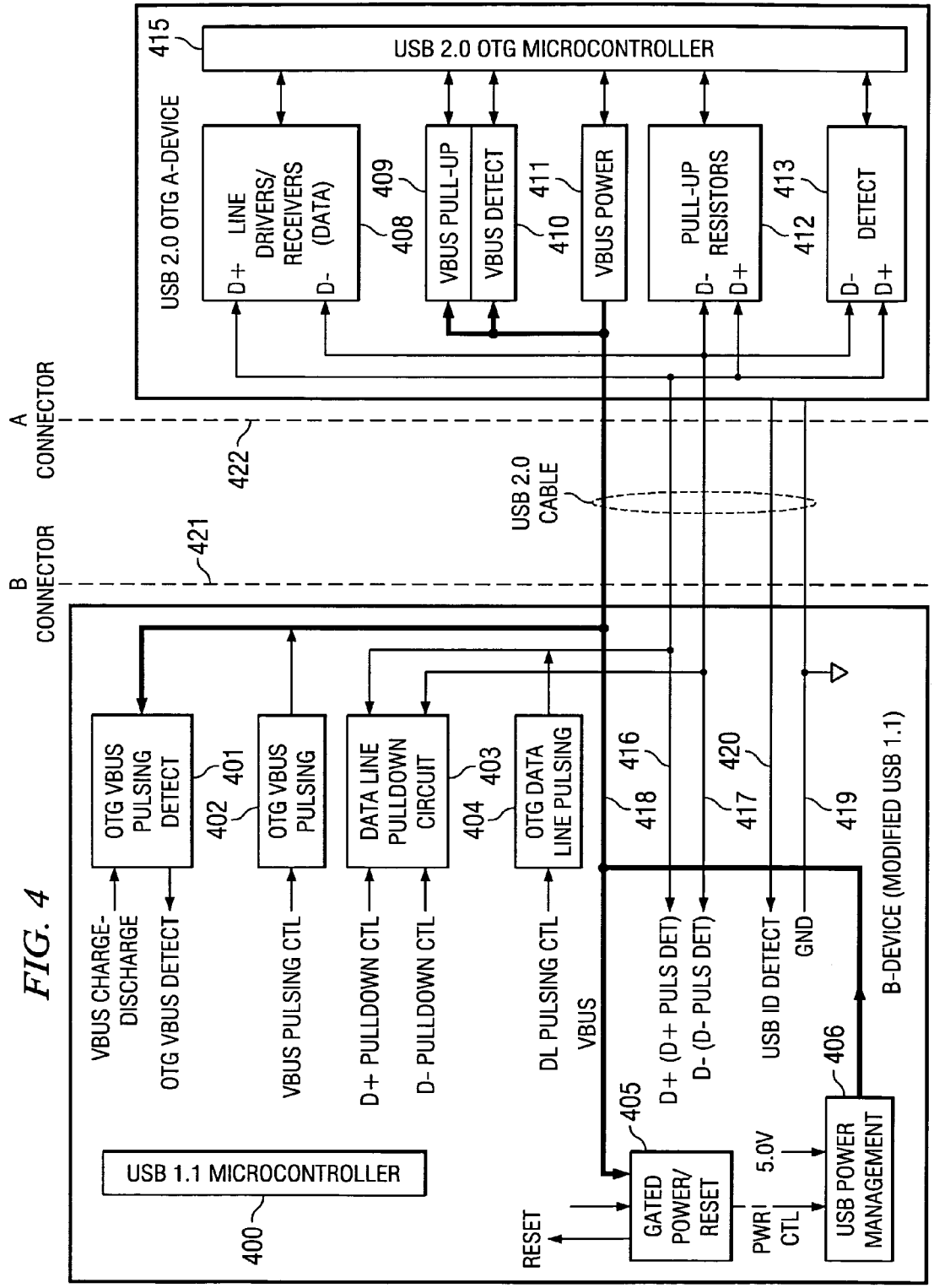
FIG. 4 illustrates the signal and interface function blocks of this invention for connection of a conventional USB 1.1 system B-Device to an external USB 2.0 OTG device/host A-Device.
Figures 5, 6, 7:
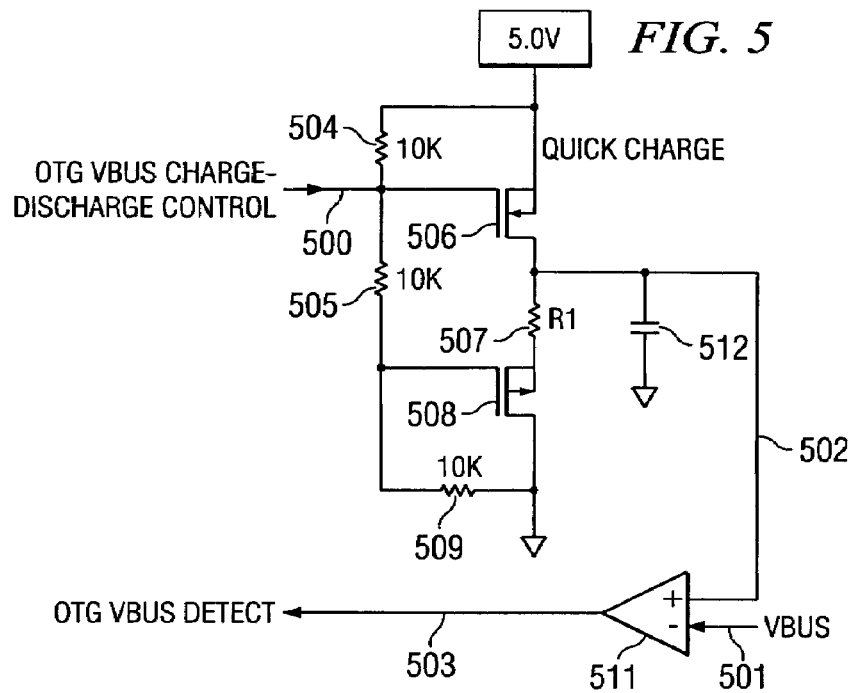
FIG. 5 illustrates the circuit diagram of the USB 1.1 OTG Vbus pulsing detect circuitry.
FIG. 6 illustrates the circuit diagram of the USB 1.1 OTG Vbus pulsing circuitry.
FIG. 7 illustrates the circuit diagram of the USB 1.1 OTG dataline pulsing circuitry.

FIG. 4 illustrates the USB 1.1 to USB 2.0 OTG microcontroller 400 and interface hardware functions 401 through 406 and their required interconnect to the USB 2.0 B-connector 421 side of the interface. USB cabling consists of D+ and D– data lines, 416 and 417 respectively, Vbus (Power supply) line 418, GND 419 and USB ID detect line 420. An USB 2.0 OTG A-device comprising microcontroller 415 and interface hardware functions 408 through 413 are connected to the USB cable through an A-connector 422. Hardware functions 401 through 406 upgrade the normal USB 1.1 capability to a modified USB 1.1 having USB 2.0 OTG compatibility. The A-device portion of FIG. 4 illustrates in symbolic form the hardware necessary to implement the USB 2.0 OTG requirements and the SRP and HNP protocols described above. This includes functional blocks 408 through 413 and microcontroller 415. The detailed content of these functions of the USB 2.0 OTG B-device is not a part of the invention. The functions performed in FIG. 4 exactly mirror the functions described in FIG. 3.

FIG. 5 illustrates the schematic diagram of the OTG Vbus Pulsing Detect circuits 301 and 401. OTG Vbus charge-discharge control is applied at input 500. With input 500 low, transistor 506 turns ON and drives charge/discharge node 502 to approximately 5.0 volts. This is referred to as the quick charge state where capacitor 512 is quickly charged to approximately 5.0 volts. When node 500 switches high transistor 506 turns OFF and transistor 508 turns ON. Node 502 is driven to the discharge state via the discharge path through resistor 507 and ON transistor 508. The discharge timing is controlled by the values of resistor 507 and capacitor 512. Resistors 504, 505 and 509 control the drive paths for transistors 506 and 508. Comparator 511 continuously compares the voltage level on the Vbus node 501 to that of the charge-discharge node 502.

As charge/discharge node 502 discharges to a low, voltage comparator 511 drives output node 503 to a high the as long as Vbus less than 5.0 volts. When the circuit transitions from quick charge to discharge the voltage at charge/discharge node 502 ramps downward to below Vbus, the voltage at output node 503 switches from high to low.

The key point of this circuit is that the discharge rate for capacitor 512 is programmed as data into the microcontroller. This allows the timing on OTG Vbus Detect 503 to be translated by the microcontroller to an equivalent Vbus voltage measurement. The microcontroller is programmed to make decisions, based on this Vbus measurement, as to whether the amplitude/timing on Vbus meet the Vbus detect requirements. The circuit is used both for detecting that the external B-Device is pulsing and that an external A-Device has powered-down. Thus, the OTG Vbus Pulsing Detect circuit implements a software-controlled mixed signal circuit discharge and quick-charge circuit to detect Vbus activity in SRP and HNP.

FIG. 6 illustrates the OTG Vbus pulsing circuits 302 and 402. When input 600 is driven high transistor 604 turns ON. Current drive from 3.3 volts supply 610 is limited by resistor 603 and charges capacitor 605 through transistor 604. When input 600 is driven low, transistor 604 turns OFF and capacitor 605 discharges through resistor 601 in series with resistor 602. This circuit provides pulsing at Vbus output 606 of sufficient energy to signal the B-Device that it is receiving Vbus pulsing from the A-Device to denote a valid SRP request.

FIG. 7 illustrates the dataline pulsing circuits 304 and 404. When input 700 is driven low transistor 703 turns ON through resistor 702. Current drive through resistor 702 provides active pull-up action at the D+ line 706. When line 700 is driven high OTG dataline pulsing ceases.

Figure 8:
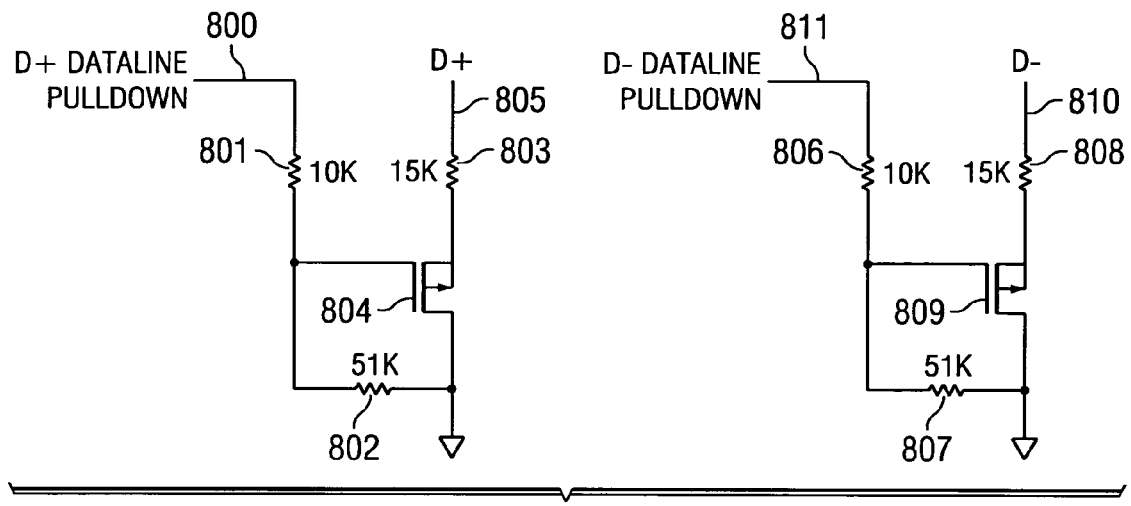
FIG. 8 illustrates the circuit diagram of the USB 1.1 OTG Dataline (D+/D−) pull-down circuitry.

FIG. 8 illustrates the dataline pull-down circuits 303 and 403. For D+, when input 800 is driven high transistor 804 turns ON through resistor 803. Current drive through 804 and resistor 803 provides active pull-down of D+ line 805. When input 800 is driven low OTG D+ dataline pull-down is disabled. Resistors 801 and 802 form a voltage divider for input drive to the gate of transistor 804.

Similarly for D−, when input 811 is driven high transistor 809 turns ON through resistor 808. Current drive through 809 and resistor 808 provides active pull-down of D−line 810. When input 811 is driven low OTG D− dataline pull-down is disabled. Resistors 806 and 807 form a voltage divider for input drive to the gate of transistor 804.

Figure 9:
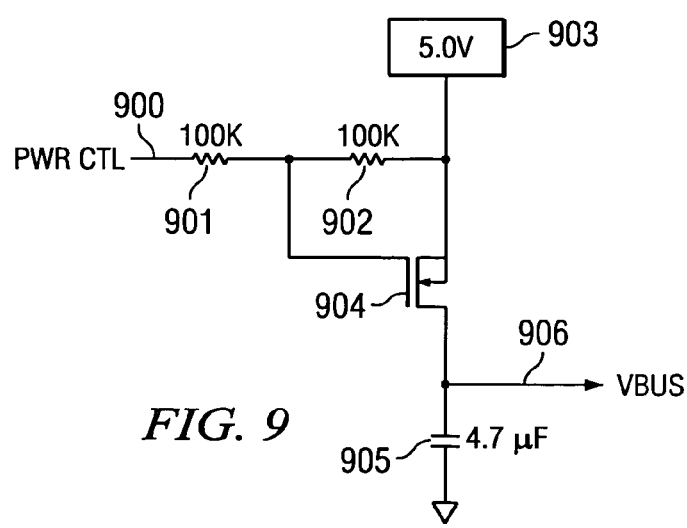
FIG. 9 illustrates the circuit diagram of the USB 1.1 OTG power management circuitry.

The USB power management circuits for blocks 306 of FIG. 3 and 406 of FIG. 4 are illustrated in FIG. 9. The 5.0 volts source 903 from the microcontroller is fed to the source of PMOS power switch transistor 904. PWR CTL 900 provides power control for activating or powering down the Vbus supply 906. When PWR CTL 900 is low transistor 904 turns ON, charges bypass capacitor 905 and powers up Vbus 906. When the microcontroller drives PWR CTL 900 high, transistor 904 turns OFF and Vbus is powered down. Vbus discharges through paths in the connecting circuitry. Resistors 901 and 902 form a voltage divider to generate gate input voltage for transistor 904.

What is claimed is:

1. An apparatus for a USB 1.1 device including a microcontroller for implementing USB OTG functions comprising:
   a Vbus pulsing detect circuit controlled by the microcontroller including
   a PMOS transistor (506) having a source connected to a power supply, a drain, and a gate connected to a charge-discharge control output of the microcontroller (500),
   a first resistor (504) connected between the source and gate of said PMOS transistor (506),
   a capacitor (512) connected between said drain of said PMOS transistor (506) and ground,
   a second resistor (507) having a first terminal connected to said drain of said PMOS transistor (506), and a second terminal,
   an NMOS transistor (508) having a source connected to said second terminal of said second resistor (507), a drain connected to ground, and a gate,
   a third resistor (505) connected between the charge-discharge control output of the microcontroller (500) and said gate of said NMOS transistor (508),
   a fourth resistor (509) connected between said gate of said NMOS transistor (508) and ground, and
   a comparator (511) having a first input connected to said drain of said PMOS transistor (506), a second input receiving the Vbus (501), and an output (503) connected to a Vbus detect input of the microcontroller;
   said microcontroller programmed to correlate a time between sending a signal on the charge-discharge control output of the microcontroller (500) to turn said NMOS transistor (508) ON and detection of tripping of said comparator (511) to a voltage on the Vbus (501) corresponding to a discharge time determined by a capacitance of said capacitor (512) and a resistance of said second resistor (507);
   a Vbus pulsing circuit controlled by the microcontroller; and
   a data line pull down detect circuit controlled by the microcontroller.

2. An apparatus for a USB 1.1 device including a microcontroller for implementing USB OTG functions comprising:
   a Vbus pulsing detect circuit controlled by the microcontroller;
   a Vbus pulsing circuit controlled by the microcontroller including
   a first resistor (603) having a first terminal connected to a voltage source (610) and a second terminal,
   an NMOS transistor (604) having a source connected to said second terminal of said first resistor, a drain connected to the Vbus (606), and a gate connected to a Vbus pulsing control output of the microcontroller (600),
   a capacitor (605) connected between said drain of said NMOS transistor and ground,
   a second resistor (601) connected between said Vbus pulsing control output of the microcontroller and said gate of said NMOS transistor, and
   a third resistor (602) connected between said gate and said drain of said NMOS transistor; and
   said microcontroller programmed to provide a low signal on said Vbus pulsing control output of the microcontroller (600) to turn said NMOS transistor (604) OFF permitting said capacitor (605) to discharge via said second resistor (601) and said third resistor (602) thereby pulsing the Vbus (606);
   a data line pull down detect circuit controlled by the microcontroller.

* * * * *